United States Patent
Stern et al.

(10) Patent No.: US 9,616,829 B2
(45) Date of Patent: Apr. 11, 2017

(54) VEHICLE ELECTRICAL CENTER

(71) Applicant: DELPHI TECHNOLOGIES, INC., Troy, MI (US)

(72) Inventors: Eric J. Stern, Farmington Hills, MI (US); William J. Mosby, Redford, MI (US); Theodore J. Borowicz, Flat Rock, MI (US)

(73) Assignee: Delphi Technologies, Inc., Troy, MI (US)

( * ) Notice: Subject to any disclaimer, the term of this patent is extended or adjusted under 35 U.S.C. 154(b) by 799 days.

(21) Appl. No.: 13/942,023

(22) Filed: Jul. 15, 2013

(65) Prior Publication Data

US 2015/0015062 A1   Jan. 15, 2015

(51) Int. Cl.
   *B60R 16/023*   (2006.01)
(52) U.S. Cl.
   CPC ................. *B60R 16/0238* (2013.01)
(58) Field of Classification Search
   CPC ..... H01R 13/62; H01R 13/627; H01R 13/271
   USPC ................... 307/9.1; 439/689, 695, 701, 904
   See application file for complete search history.

(56) References Cited

U.S. PATENT DOCUMENTS

| 6,095,844 | A | * | 8/2000 | Kasai | H01R 9/2466 439/350 |
|---|---|---|---|---|---|
| 2003/0129864 | A1 | | 7/2003 | Peloza | |
| 2005/0011658 | A1 | * | 1/2005 | Oda | B60R 16/0238 174/50 |
| 2010/0038133 | A1 | | 2/2010 | Senk et al. | |
| 2012/0064741 | A1 | | 3/2012 | Kawaguchi et al. | |

FOREIGN PATENT DOCUMENTS

| EP | 1209036 A2 | 5/2002 |
|---|---|---|
| EP | 1209036 A3 | 11/2003 |

OTHER PUBLICATIONS

European Search Report for Application No. EP 14173833 published Dec. 2, 2014.

* cited by examiner

*Primary Examiner* — Thienvu Tran
*Assistant Examiner* — David M Stables
(74) *Attorney, Agent, or Firm* — Robert J. Myers

(57) ABSTRACT

An electrical center for distributing electrical power to an electrical system of a vehicle is provided. A housing of the electrical center includes a shroud that protrudes outward from a sidewall of the housing. A fuse assembly which is configured to fit into the housing includes a tab that protrudes outward from the sidewall. A sleeve is configured to engage the shroud and the tab such that a receptacle for a connector of the electrical system is formed on the sidewall.

8 Claims, 4 Drawing Sheets

VEHICLE ELECTRICAL CENTER

TECHNICAL FIELD OF INVENTION

This disclosure generally relates to an electrical center for distributing electrical power, and more particularly to an electrical center for distributing electrical power to an electrical system of a vehicle.

BACKGROUND OF INVENTION

An electrical center of a motor vehicle typically includes fuses to protect electrical components of the electrical system from damage caused by short circuits. Electrical centers are sometimes referred to as fuse blocks or fuse boxes. Typically, a vehicle contains multiple electrical centers. Low current fuses (i.e. fuses rated for less than 60 amps) may be located within a low current electrical center (LCEC) that distributes electrical power to low current circuits, and high current fuses (i.e. fuses rated for 60 amps or greater) may be located within a high current electrical center (HCEC) that distributes electrical power to high current circuits. The HCEC is known to be mounted to the exterior surface of the LCEC and electrically connected to a bus bar that extends from the LCEC. Known shortcomings of this mounting configuration are the additional costs associated with the need for separate covers for the LCEC and HCEC, and poor access to connector receptacles that are located on the bottom side of the HCEC due to HCEC design limitations.

SUMMARY OF THE INVENTION

In accordance with one embodiment, an electrical center for distributing electrical power to an electrical system of a vehicle is provided. The electrical center includes a housing which is configured to interconnect electrical components that distribute electrical power to the electrical system. The housing includes a shroud that protrudes outward from a sidewall of the housing. The electrical center further includes a fuse assembly which is configured to fit into the housing. The fuse assembly includes a tab which is configured to protrude outward of the sidewall. The electrical center further includes a sleeve which is configured to engage the shroud and the tab such that a receptacle suitable to couple a connector of the electrical system to the housing is formed on the sidewall.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
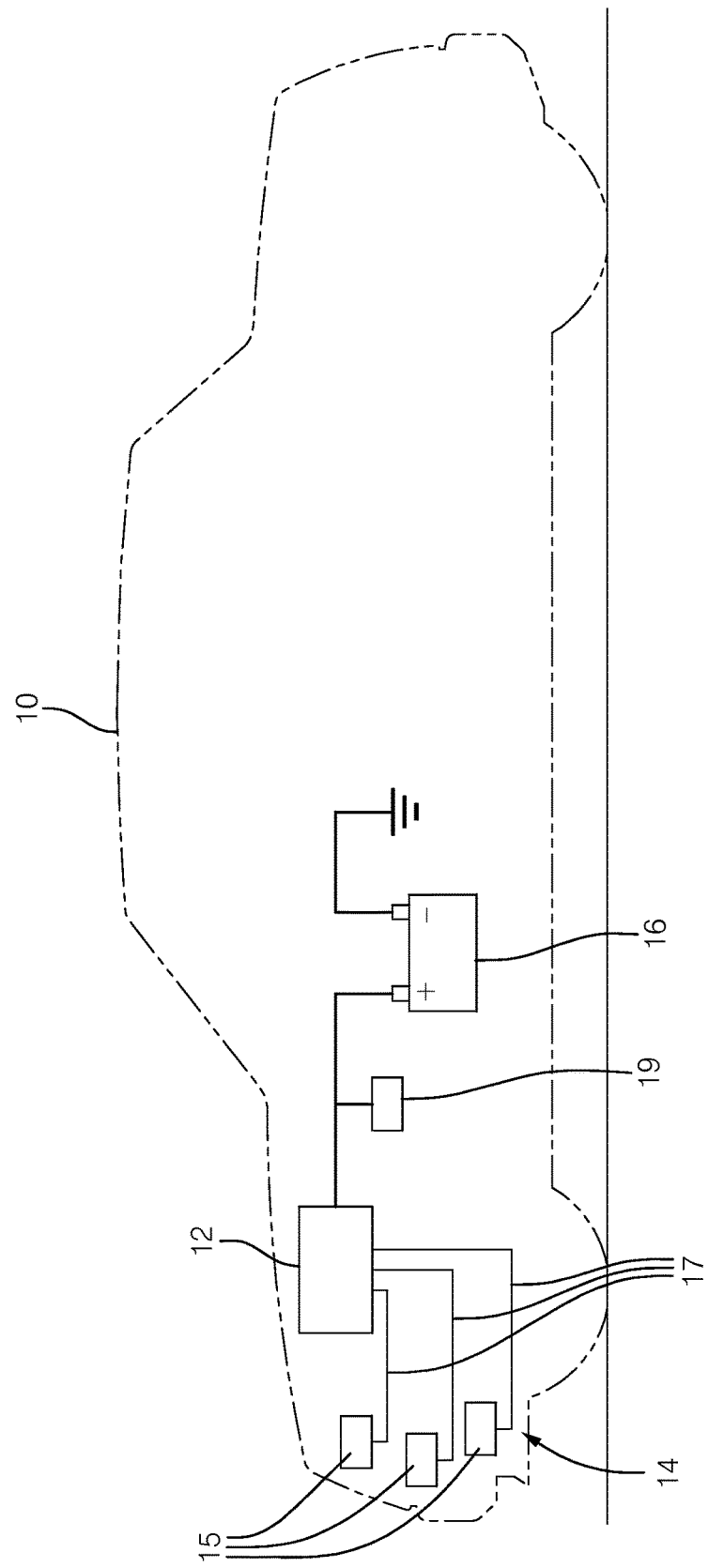
FIG. 1 is an illustration of a vehicle equipped with an electrical center.

FIG. 1 illustrates a non-limiting example of a vehicle 10 equipped with an electrical center 12. The electrical center 12 distributes and limits the flow of electrical power to an electrical system 14 of the vehicle 10. The electrical system 14 typically includes various devices 15 of the vehicle 10, such as a horn, headlamps, power steering motor, etc., and the associated wiring harness 17 that is required to carry electrical power from the electrical center 12 to each of the devices 15. In general, the electrical center 12 receives electrical power from a battery 16 and an alternator 19 of the vehicle 10. The electrical center 12 limits the flow of electrical power being distributed to the electrical system 14 such that damage does not occur to the electrical system 14 as a result of a short circuit within the electrical system 14.

Figure 2A:
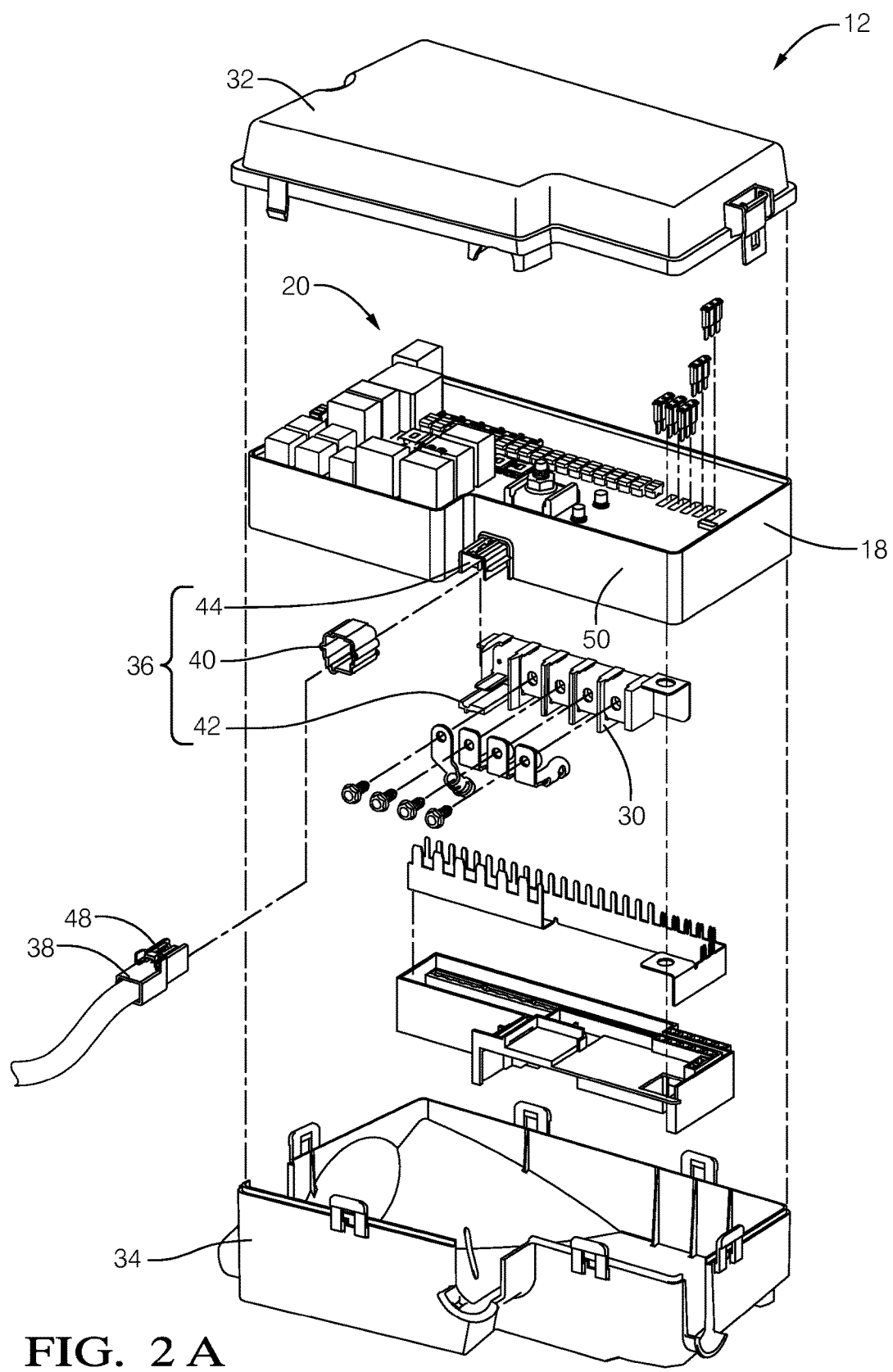
FIG. 2A is an exploded view of the electrical center.
Figure 2:
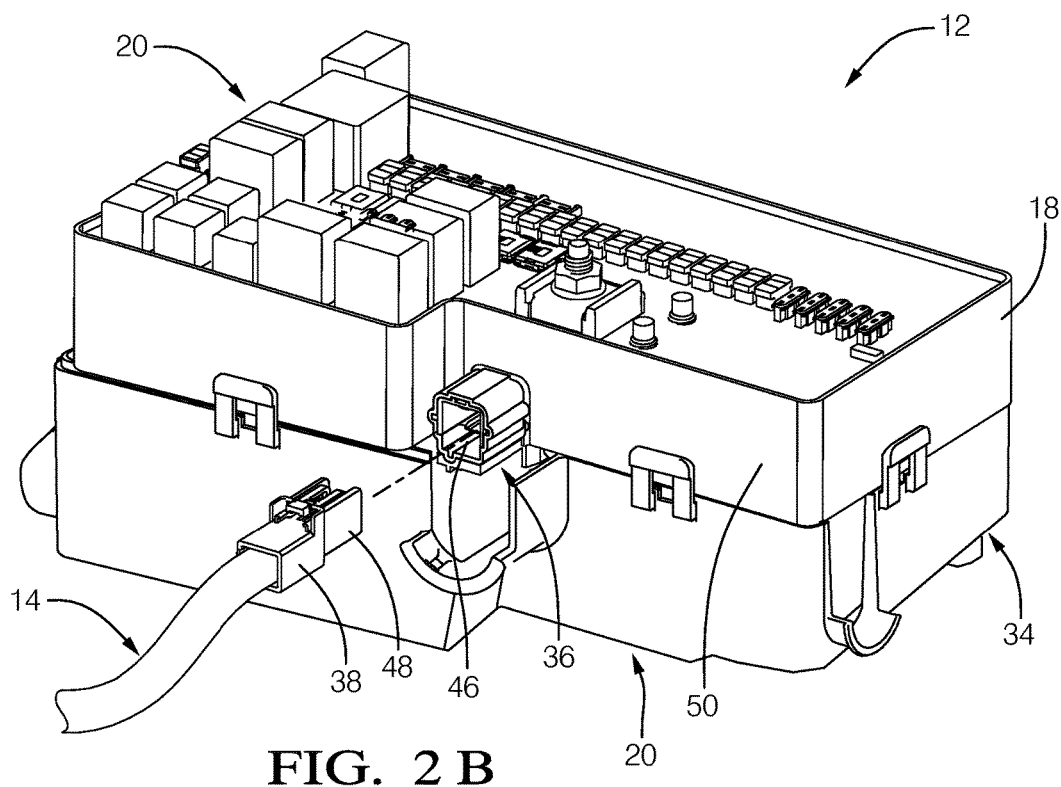
FIG. 2B is view of the electrical center without the upper cover.

FIGS. 2A and 2B illustrate a non-limiting example of the electrical center 12. The electrical center includes a housing 18 that is configured to interconnect electrical components 20 that distribute electrical power to the electrical system 14. The housing 18 is preferably made of plastic. The electrical components 20 include, but are not limited to, bus bars, low current fuses, relays, and high current fuses. It is noted here that the electrical center 12 includes both low and high current fuses that are known to be housed in separate electrical centers (i.e. a LCEC and a HCEC). Some of the high current fuses are integrated into a high current fuse assembly 30 that fits into and attaches to the housing 18. The electrical components 20 are interconnected such that a limited amount of electrical power (i.e. current) is distributed to each of the devices 15 of the electrical system 14. The methods and means for designing, selecting, and interconnecting the electrical components 20 are well known and will not be described in detail herein.

The electrical center 12 includes a receptacle 36 that is located on a sidewall 50 of the housing 18. The receptacle 36 is suitable for coupling a connector 38 of the electrical system 14 to the housing 18. The receptacle 36 is formed when a sleeve 40 engages a tab 42 of fuse assembly 30 and a shroud 44 of the housing 18, both of which protrude outwards of the sidewall 50. The shroud 44 and the sleeve 40 define an inner surface 46 of the receptacle 36. The inner surface 46 is configured to engage with an outer surface 48 of the connector 38. The sleeve 40, tab 42, and shroud 44 are all preferably made of plastic.

An upper cover 32 and a lower cover 34 of the electrical center 12 protect the electrical components 20 from environmental exposure. The upper cover 32 and lower cover 34 are preferably made of plastic. It is noted here that the electrical center 12 requires only a single upper cover versus known electrical center configurations that require separate upper covers for a LCEC and a HCEC.

Figure 3:
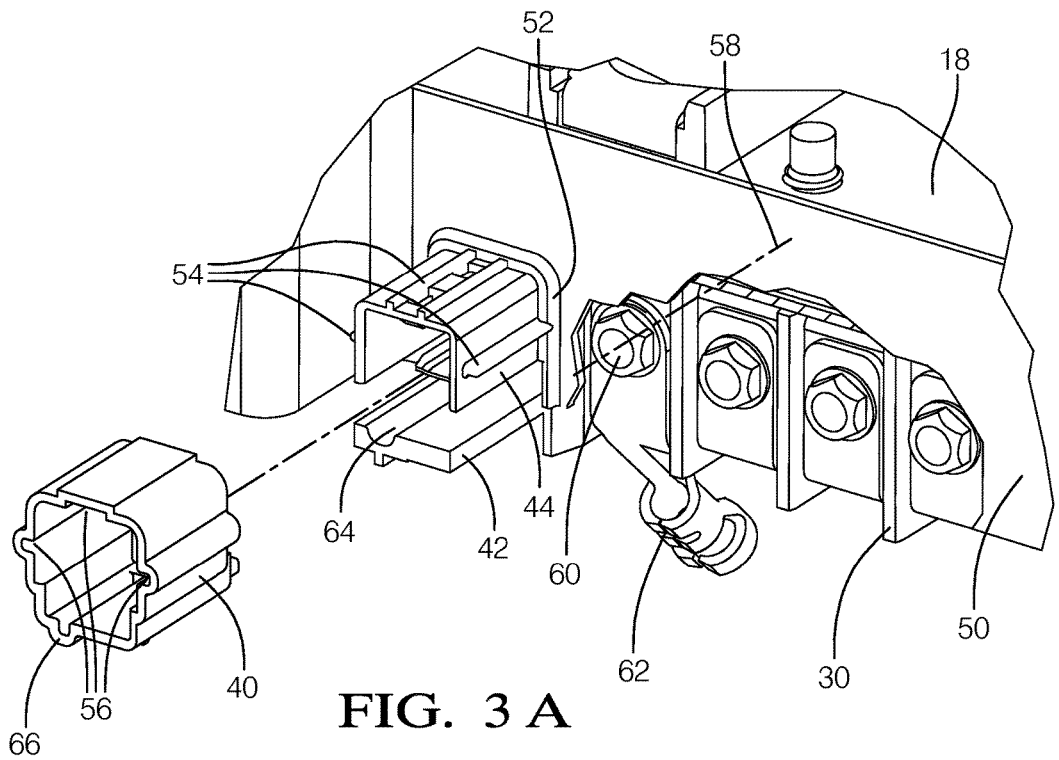
FIG. 3A is a first close-up view of a housing, shroud, tab, and sleeve of the electrical center.
FIG. 3B is a second close-up view of the housing, shroud, tab, and sleeve.
FIG. 3C is a sectional view of the shroud, tab, and sleeve.
Figure 3:
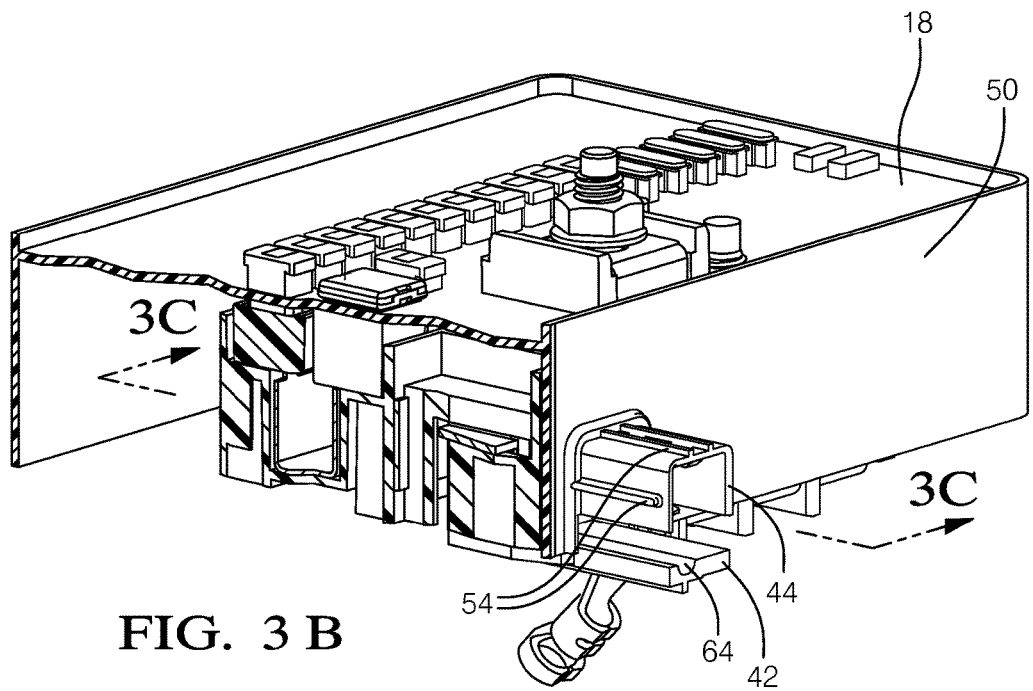
Figure 3:
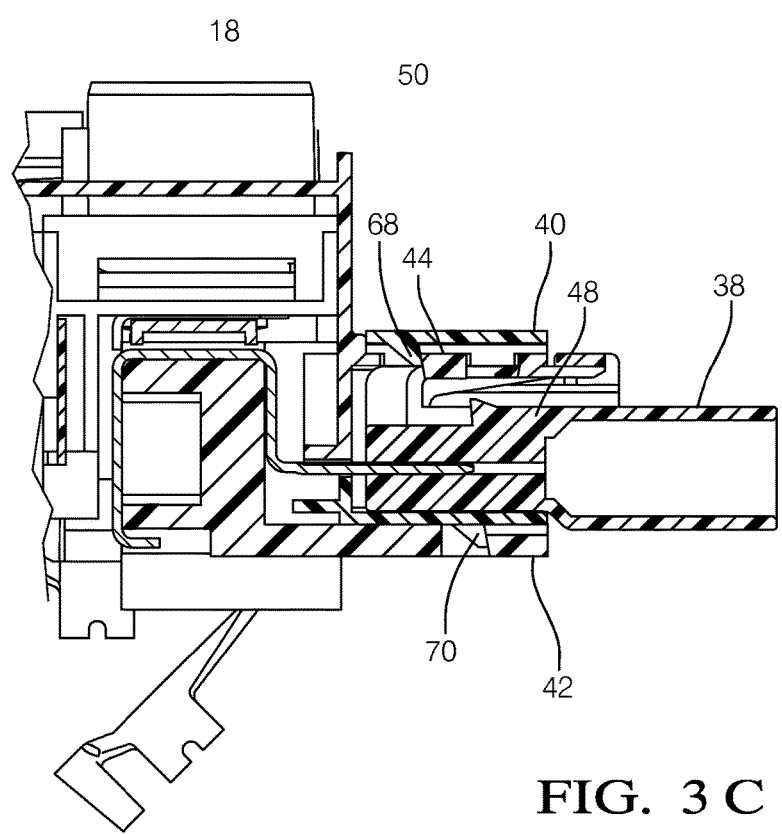

FIGS. 3A, 3B, and 3C illustrate some non-limiting features of the housing 18, shroud 44, tab 42, and the sleeve 40.

The shroud 44 is substantially perpendicular to the sidewall 50 so that the receptacle 36 is easily accessible for making a connection with the connector 38. Used herein, the term substantially means within +/−5 degrees. It is noted here that known HCEC configurations include high current fuses assemblies with integral receptacles that face downwards and are difficult to access. A reinforcement portion 52 of the housing 18 is located at the base of the shroud 44 to increase the flex and tear resistance of the shroud 44. The shroud 44 includes a plurality of shroud ridges 54 that are configured to engage with a plurality of sleeve grooves 56 of the sleeve 40. The shroud ridges 54 and sleeve grooves 56 increase the bending stiffness of the shroud 44 and sleeve 40 respectively, and aid in aligning the sleeve 40 with the shroud 44.

The tab 42 is substantially parallel to the shroud 44 and an axis 58 of a fastener 60. The fastener 60 is configured to attach a terminal 62 of the electrical system 14 to the high current fuse assembly 30. The tab 42 includes a tab groove 64 which is configured to engage with a sleeve ridge 66 of the sleeve 40. The tab groove 64 and sleeve ridge 66 increase the bending stiffness of the tab 42 and sleeve 40 respectively, and aid in aligning the sleeve 40 with the tab 42.

The sleeve 40 includes a first wedge 68 which is configured to lock the sleeve 40 to the shroud 44 and a second wedge 70 which is configured to lock the sleeve 40 to the tab 42.

Accordingly, an electrical center 12 for a vehicle 10 is provided. The electrical center 12 provides for the use of a common upper cover to protect both low and high current fuses and fuse assemblies. The electrical center 12 also provides for easy access to a connector receptacle that is located on a side of the electrical center 12.

While this invention has been described in terms of the preferred embodiments thereof, it is not intended to be so limited, but rather only to the extent set forth in the claims that follow.

We claim:

1. An electrical center for distributing electrical power to an electrical system of a vehicle, said electrical center comprising:
    a housing configured to interconnect electrical components that distribute electrical power to the electrical system, wherein the housing includes a shroud that protrudes outward from a sidewall of the housing;
    a fuse assembly configured to fit into the housing defining a tab that protrudes outward of the sidewall; and
    a sleeve configured to engage the shroud and the tab such that the shroud is enclosed within the sleeve and the tab is external to the sleeve, thereby forming a receptacle suitable to couple a connector of the electrical system to the housing on the sidewall, wherein the tab defines a tab groove that is configured to engage a sleeve ridge defined on an outer surface of the sleeve.

2. The electrical center according to claim 1, wherein the shroud is substantially perpendicular to the sidewall.

3. The electrical center according to claim 2, wherein the tab is substantially parallel to the shroud.

4. The electrical center according to claim 2, wherein the shroud and the sleeve define an inner surface of the receptacle configured to engage with an outer surface of the connector.

5. The electrical center according to claim 2, wherein the sleeve includes a first wedge configured to lock the sleeve to the shroud and a second wedge configured to lock the sleeve to the tab.

6. The electrical center according to claim 2, wherein the housing includes a reinforcement portion at the base of the shroud configured to increase the flex and tear resistance of the shroud.

7. The electrical center according to claim 2, wherein the shroud includes a shroud ridge configured to engage with a sleeve groove of the sleeve.

8. The electrical center according to claim 2, wherein the tab is substantially parallel to an axis of a fastener configured to attach a terminal of the electrical system to the fuse assembly.

* * * * *